United States Patent
Magzimof et al.

(10) Patent No.: US 10,965,529 B2
(45) Date of Patent: Mar. 30, 2021

(54) PLATFORM FOR VEHICLE COOPERATION AND COORDINATION OF SERVICES

(71) Applicant: Phantom Auto Inc., Mountain View, CA (US)

(72) Inventors: Shay Magzimof, Palo Alto, CA (US); David Parunakian, Moscow (RU)

(73) Assignee: PHANTOM AUTO INC., Mountain View, CA (US)

(*) Notice: Subject to any disclaimer, the term of this patent is extended or adjusted under 35 U.S.C. 154(b) by 8 days.

(21) Appl. No.: 16/375,678

(22) Filed: Apr. 4, 2019

(65) Prior Publication Data
US 2019/0312779 A1 Oct. 10, 2019

Related U.S. Application Data

(60) Provisional application No. 62/653,351, filed on Apr. 5, 2018.

(51) Int. Cl.
*H04L 12/24* (2006.01)
*H04W 16/24* (2009.01)
*H04W 4/44* (2018.01)

(52) U.S. Cl.
CPC .......... *H04L 41/0823* (2013.01); *H04W 4/44* (2018.02); *H04W 16/24* (2013.01)

(58) Field of Classification Search
None
See application file for complete search history.

(56) References Cited

U.S. PATENT DOCUMENTS

| 2013/0132854 A1* | 5/2013 | Raleigh | H04W 4/60 715/738 |
| 2019/0312779 A1* | 10/2019 | Magzimof | H04W 4/44 |
| 2019/0383624 A1* | 12/2019 | Magzimof | H04B 17/373 |

OTHER PUBLICATIONS

Abreu, D. et al., "The Folk Theorem for Repeated Games: A Neu Condition," Econometrica, vol. 62, No. 4. Jul. 1994, pp. 939-948.
Abreu, D. et al., "The Structure of Nash Equilibrium in Repeated Games with Finite Automata," Econometrica, vol. 56, No. 6, Nov. 1988, pp. 1259-1281.
Agrawal, R., "Sample Mean Based Index Policies with O(log n) Regret for the Multi-Armed Bandit Problem," Adv, Appl. Prob., vol. 27, Dec. 1995, pp. 1054-1078.
Alnoman, A. et al., "Fuzzy-Based Joint User Association and Resource Allocation in HetNets," 2017 IEEE 86th Vehicular Technology Conference (VTC-Fall), Sep. 2017, pp. 1-5.
Auer, P et al., "Gambling in a rigged casino: The adversarial multi-armed bandit problem," Proceedings of IEEE 36th Annual Foundations of Computer Science, Oct. 1995, pp. 322-331.
Baily, M.N., "On the Theory of Layoffs and Unemployment," Econometrica, vol. 45, No. 5, Jul. 1977, pp. 1043-1063.

(Continued)

*Primary Examiner* — Phuongchau Ba Nguyen
(74) *Attorney, Agent, or Firm* — Fenwick & West LLP (57) ABSTRACT

A control platform generates commands for coordinating use of network resources between a plurality of vehicles within a geographic region. In an embodiment, game-theoretical modelling is employed to determine allocation of resources in a manner that provides an optimal solution for a given allocation strategy. This model may reward controllers of vehicles that comply with a coordination policy while penalizing controllers of vehicles that defect from compliance.

20 Claims, 4 Drawing Sheets

(56) References Cited

OTHER PUBLICATIONS

Bannour, A. et al., "MIMO-OFDM Based Energy Harvesting Cooperative Communications Using Coalitional Game Algorithm," IEEE Transactions on Vehicular Technology, Nov. 2017, pp. 1-15.
Benoit, J-P. et al., "Finitely Repeated Games," Econometrica, vol. 53, No. 4, Jul. 1985, pp. 905-922.
Berg, K. et al., "Equilibrium Paths in Discounted Supergames," Elsevier, Dec. 18, 2012, pp. 1-21.
Canzian, L. et al., "Promoting Cooperation in Wireless Relay Networks Through Stackelberg Dynamic Scheduling," IEEE Transactions on Communications, vol. 61, No. 2, Feb. 2013, pp. 700-711.
Cao, Q. et al., "Power Allocation and Pricing in Multiuser Relay Networks Using Stackelberg and Bargaining Games," IEEE Transactions on Vehicular Technology, vol. 61, No. 7, Sep. 2012, pp. 3177-3190.
Chen, K. et al., "Fair Resource Allocation in OFDMA Two-Hop Cooperative Relaying Cellular Networks," 2009 IEEE 70th Vehicular Technology Conference Fall, Sep. 2009, pp. 1-5.
Colonnese, S. et al., "Dynamic and Cooperative Mobile Video Streaming Across Heterogeneous Cellular Networks," 2016 IEEE 17th International Symposium on a World of Wireless, Mobile and Multimedia Networks (WoWMoM), Jun. 2016, pp. 1-8.
Cong, L. et al., "Pricing-based game for spectrum allocation in multi-relay cooperative transmission networks," IET Communications, vol. 5, Iss. 4, Mar. 2011, pp. 563-573.
Dall'Aglio, M., "The Dubins-Spanier optimization problem in fair division theory," Journal of Computational and Applied Mathematics, vol. 130, May 2001, pp. 17-40.
Davidson, C. et al., "Excess Capacity and Collusion," International Economic Review, vol. 31, No. 3, Aug. 1990, pp. 521-541.
Denda, R. et al., "The Fairness Challenge in Computer Networks," International Workshop on Quality of Future Internet Services, QofIS 2000: Quality of Future Internet Services, Sep. 24, 2002, pp. 208-220.
Dubins, L. E. et al., "How to Cut a Cake Fairly," The American Mathematical Monthly, vol. 68, No. 1, Jan. 1961, pp. 1-17.
Fehr, E. et al., "Strong Reciprocity, Human Cooperation, and the Enforcement of Social Norms," Human Nature, vol. 13, No. 1, Mar. 2002, pp. 1-25.
Friedman, J.W., "A Non-cooperative Equilibrium for Supergames," The Review of Economic Studies, vol. 38, No. 1, Jan. 1971, pp. 1-12.
Fudenberg, D. et al., "The Folk Theorem in Repeated Games with Discounting or with Incomplete Information," Econometrica, vol. 54, No. 3, May 1986, pp. 533-554.
Hamouda, S. et al., "Cooperative Bandwidth Sharing for Relaying in LTE-Advanced Using Game Theory," IEEE Transactions on Vehicular Technology, vol. 64, Iss 6, Jun. 2015, pp. 1-13.
Hoang, D. T. et al., "Applications of Repeated Games in Wireless Networks: A Survey," IEEE Communications Surveys & Tutorials, vol. 17, Iss. 4, Jun. 2015, pp. 1-35.
Imhof, L.A. et al., "Tit-for-tat or win-stay, lose-shift?," Journal of Theoretical Biology, vol. 247, Mar. 2007, pp. 574-580.
Iwase, T. et al., "Linear Game Theory: Reduction of complexity by decomposing large games into partial games," arXiv:1609.00481, Sep. 9, 2016, pp. 1-15.
Iyer, K. et al., "A Procedure for the Allocation of Two-Dimensional Resources in a Multiagent System," International Journal of Cooperative Information Systems, vol. 18, Nos. 3 & 4, Sep. 2009, pp. 381-422.
Kandeepan, S. et al., "Power-Trading in Wireless Communications: A Cooperative Networking Business Model," IEEE Transactions on Wireless Communications, vol. 11, No. 5, Mar. 2012, pp. 1-10.
Kaplow, L. et al., "Notions of Fairness versus the Pareto Principle: On the Role of Logical Consistency," The Yale Law Journal, vol. 110, No. 2, Nov. 2000, pp. 237-249.
Kaplow, L. et al., "The Conflict between Notions of Fairness and the Pareto Principle," American Law and Economics Review, vol. 1, Iss. 1, Jan. 1999, pp. 63-77.

Kreps, D.M. et al., "Rational Cooperation in the Finitely Repeated Prisoners' Dilemma," Journal of Economic Theory, vol. 27, Iss. 2, Aug. 1982, pp. 245-252.
Lambertini, L. et al., "Marginal costs and collusive sustainability," Economics Letters, vol. 72, Iss. 1, Jul. 2001, pp. 117-120.
Liang, W. et al., "Cooperative Overlay Spectrum Access in Cognitive Radio Networks," IEEE Communications Surveys & Tutorials, vol. 19, Iss. 3, Apr. 2017, pp. 1924-1944.
Liu, D. et al., "Stackelberg Game Based Cooperative User Relay Assisted Load Balancing in Cellular Networks," IEEE Communications Letters, vol. 17, No. 2, Feb. 2013, pp. 424-427.
Ma, C. et al., "A Game Theory Based Congestion Control Protocol for Wireless Personal Area Networks," Hindawi Publishing Corporation, Journal of Sensors, vol. 2016, Article ID 6168535, Dec. 7, 2015, pp. 1-13.
Mccabe, K.A. et al., "Game theory and reciprocity in some extensive form experimental games," Proc. Natl. Acad. Sci., vol. 93, Nov. 1996, pp. 13421-13428.
Megiddo, N., "Essays in Game Theory," Springer-Verlag New York, Inc., Mar. 29, 1994, pp. 1-209.
Moura, J. et al., "Game Theory for Multi-Access Edge Computing: Survey, Use Cases, and Future Trends," IEEE Communications Surveys & Tutorials, vol. 21, Iss. 1, Aug. 3, 2018, pp. 1-46.
Mukherjee, A. et al., "A Coalition Game Framework for Decode-and-Forward Relay Networks," 2009 IEEE 70th Vehicular Technology Conference Fall, Sep. 2009, pp. 1-5.
Nelson, W. L., "Physical Principles for Economies of Skilled Movements," Biol. Cybern., vol. 46, 1983, pp. 135-147.
Niyato, D. et al., "Relay-Centric Radio Resource Management and Network Planning in IEEE 802.16j Mobile Multihop Relay Networks," IEEE Transactions on Wireless Communications, vol. 8, No. 12, Dec. 2009, pp. 6115-6125.
Nowak, M. et al., "A strategy of win-stay, lose-shift that outperforms tit-for-tat in the Prisoner's Dilemma game," Nature, vol. 364, Jul. 1, 1993, pp. 56-58.
Nowak, M. et al., "The Evolution of Stochastic Strategies in the Prisoner's Dilemma," Acta Applicandae Mathematicae, vol. 20, Sep. 1990, pp. 247-265.
Nowak, M. et al., "Tit for tat in heterogeneous populations," Nature, vol. 355, Jan. 16, 1992, pp. 250-253.
Nowak, M., "Five Rules for the Evolution of Cooperation," Science, vol. 314, Dec. 8, 2006, pp. 1560-1563.
Ohta, Y. et al., "Controlling TCP ACK Transmission: Impact of Discard Ratio on Performance in LTE-Advanced Pro," 2017 IEEE Conference on Standards for Communications and Networking (CSCN), Sep. 2017, pp. 227-232.
Pan, Y. et al., "A Game Theoretic Approach to Distributed Resource Allocation for OFDMA-Based Relaying Networks," 2008 IEEE 19th International Symposium on Personal, Indoor and Mobile Radio Communications, Sep. 2008, pp. 1-5.
Papadimitriou, C. et al., "Computing Correlated Equilibria in Multi-Player Games," Journal of the ACM, vol. 55, No. 3, Article 14, Jul. 2008, pp. 1-29.
Pazner, E.A. et al., "A Difficulty in the Concept of Fairness," The Review of Economic Studies, vol. 41, No. 3, Jul. 1974, pp. 441-443.
Rand, D.G. et al., "Direct reciprocity with costly punishment: Generous tit-for-tat prevails," Journal of Theoretical Biology, vol. 256, Oct. 2, 2008, pp. 45-57.
Rubinstein, A., "Equilibrium in Supergames with the Overtaking Criterion," Journal of Economic Theory, vol. 21, Aug. 1979, pp. 1-9.
Rubinstein, A., "Inapproximability of Nash Equilibrium," STOC'15, Jun. 2015, pp. 409-418.
Rubinstein, A., "Strong Perfect Equilibrium in Supergames," International Journal of Game Theory, vol. 9, Iss. 1, Mar. 1980, pp. 1-12.
Schlag, K.H., "Why Imitate, and If So, How?: A Boundedly Rational Approach to Multi-armed Bandits," Journal of Economic Theory, vol. 78, Jan. 1998, pp. 130-156.
Semsar-Kazerooni, E. et al., "Multi-agent team cooperation: A game theory approach," Automatica, vol. 45, Jul. 24, 2009, pp. 2205-2213.
Shi, Y. et al., "Coalition-Assisted Resource Allocation in Large Amplify-and-Forward Cooperative Networks," IEEE Transactions on Vehicular Technology, vol. 61, No. 4, May 2012, pp. 1863-1873.

(56) References Cited

OTHER PUBLICATIONS

Shi, Y. et al., "Power Control for Relay-Assisted Wireless Systems with General Relaying," 2010 IEEE International Conference on Communications, May 2010, pp. 1-5.
Song, L. et al., "Game-Theoretic Resource Allocation Methods for Device-to-Device Communication," IEEE Wireless Communications, Jun. 2014, pp. 136-144.
Sun, W. et al., "Resource Sharing and Power Allocation for D2D-based Safety-Critical V2X Communications," IEEE ICC 2015—Workshop on Dependable Vehicular Communications (DVC), Jun. 2015, pp. 2399-2405.
Tuyls, K. et al., "Symmetric Decomposition of Asymmetric Games," Scientific Reports, Jan. 17, 2018, pp. 1-20.
Verbeeck, K. et al., "Learning to Reach the Pareto Optimal Nash Equilibrium as a Team," Australian Joint Conference on Artificial Intelligence, AI 2002: AI 2002: Advances in Artificial Intelligence, Nov. 8, 2002, pp. 407-418.
Wang, B. et al., "Distributed Relay Selection and Power Control for Multiuser Cooperative Communication Networks Using Stackelberg Game," IEEE Transactions on Mobile Computing, vol. 8, No. 7, Jul. 2009, pp. 975-990.
Wang, S. et al., "Energy-Efficient Power Allocation for Multi-user Single-DF-Relay Networks," Wireless Pers Commun, vol. 97, Jul. 28, 2017, pp. 3725-3742.
Wang, X. et al., "Cache in the Air: Exploiting Content Caching and Delivery Techniques for 5G Systems," IEEE Communications Magazine, Feb. 2014, pp. 131-139.
Xiao, L. et al., "Distributed Multi-cell Power Allocation Algorithm for Energy Efficiency in OFDMA Relay Systems," 2009 IEEE International Conference on Communications Workshops, Jun. 2009, pp. 1-5.
Xiao, Y. et al., "Game Theoretic Analysis for Spectrum Sharing with Multi-Hop Relaying," IEEE Transactions on Wireless Communications, vol. 10, No. 5, May 2011, pp. 1527-1537.
Yan, X. et al., "Constrained Stochastic Game in Licensed-Assisted Access for Dynamic Contention Window Adaptation," IEEE Communications Letters, vol. 22, Iss. 6, Jun. 2018, pp. 1-4.
Yan, Y. et al., "Dynamic Bargaining for Relay-Based Cooperative Spectrum Sharing," IEEE Journal on Selected Areas in Communications, vol. 31, No. 8, Aug. 2013, pp. 1480-1493.
Yang, B. et al., "Fair Resource Allocation using Bargaining over OFDMA Relay Networks," Joint 48th IEEE Conference on Decision and Control and 28th Chinese Control Conference Shanghai, P.R. China, Dec. 16-18, 2009, pp. 585-590.
Yang, C. et al., "Utility function design for strategic radio resource management games: An overview, taxonomy, and research challenges," Trans Emerging Tel Tech., vol. 28, Nov. 7, 2016, pp. 1-16.
Yu, X. et al. "A Non-cooperative Game Approach for Distributed Power Allocation in Multi-Cell OFDMA-Relay Networks," VTC Spring 2008—IEEE Vehicular Technology Conference, May 2008, pp. 1920-1924.
Zhang, D. et al., "Bandwidth Exchange as an Incentive for Relaying," 2008 42nd Annual Conference on Information Sciences and Systems, Mar. 2008, pp. 749-754.
Zhou, D. et al., "Multipath TCP for User Cooperation in LTE Networks," IEEE Network, Jan. 2015, pp. 18-24.
Zhukovskiy, V. I. et al., "Pareto-Optimal Nash Equilibrium: Sufficient Conditions and Existence in Mixed Strategies," Automation and Remote Control, vol. 77, No. 8, Aug. 10, 2016, pp. 1500-1510.
Zimmermann, M. et al., "Acting Together by Mutual Control: Evaluation of a Multimodal Interaction Concept for Cooperative Driving," 2014 International Conference on Collaboration Technologies and Systems (CTS), May 2014, pp. 227-235.

\* cited by examiner

PLATFORM FOR VEHICLE COOPERATION AND COORDINATION OF SERVICES

CROSS-REFERENCE TO RELATED APPLICATIONS

This application claims the benefit of U.S. Provisional Patent Application No. 62/653,351 filed Apr. 5, 2018, the contents of which are incorporated by reference herein.

BACKGROUND

Technical Field

The present disclosure relates to control and management of a wireless network utilized by connected vehicles.

Description of Related Arts

Recent advances in autonomous and remotely controlled vehicle technology are likely to disrupt the urban landscape and reinvent the way transportation systems are developed and utilized. Before long, modern cities will have to support vast fleets of networked vehicles that connect to remote data centers to send telemetry to and execute commands issued by either artificial intelligence agents or human operators. Due to the inherent danger posed by vehicles of any kind, network connections used by such vehicles should be stable, providing high-throughput, low-latency, low-jitter connections. Whenever it is not possible to fully satisfy these requirements, the network connection properties should be as predictable as possible.

Building a vehicle connection management system satisfying these constraints is challenged by the plethora of vehicles operated by multiple unrelated parties competing for a limited amount of network resources. Existing game-theoretical and ecological research as well as empirical evidence indicate that an uncontrolled competition for bandwidth is expected to be detrimental for all involved entities due to interference, channel congestion, and other issues that arise in all multi-agent systems populated with uncoordinated self-interested actors.

SUMMARY OF THE EMBODIMENTS

A method, non-transitory computer-readable storage medium and system coordinates between a plurality of vehicles connected to one or more networks. For each of the plurality of vehicles, respective sets of state parameters describing respective states of the plurality of vehicles are obtained over the one or more networks. Respective karma scores are maintained for controllers of each of the plurality of vehicles. The respective karma scores indicate measures of historical compliance with respective coordination policies for controlling sharing of network resources of the one or more networks between the plurality of vehicles. The respective coordination policies for the plurality of vehicles are updated based on the respective sets of state parameters and the respective karma scores. The respective coordination policies are dispatched to the controllers of the plurality of vehicles. Feedback is obtained from the plurality of vehicles indicating respective current compliances with their respective coordination parameters. The respective karma scores are then updated based on the feedback.

In another embodiment, respective availabilities of network resources are determined based on the vehicle state parameters, and a coordination platform distributes resource availability messages to controllers of the vehicles indicating the respective availabilities. In response to the resource availability messages, the coordination platform receives bids from controllers of the vehicles for the network resources. The coordination platform then updates coordination policies based on the bids to control allocation and sharing of the network resources.

BRIEF DESCRIPTION OF THE DRAWINGS

For a more complete understanding of the invention, reference is made to the following description and accompanying drawings, in which.

DETAILED DESCRIPTION

A control platform generates commands for coordinating use of network resources between a plurality of vehicles within a geographic region. In an embodiment, game-theoretical modelling is employed to determine the allocation of resources in a manner that provides an optimal solution for a given allocation strategy. This model may reward controllers of vehicles that comply with a coordination policy while penalizing controllers of vehicles that defect from compliance.

Figure 1:
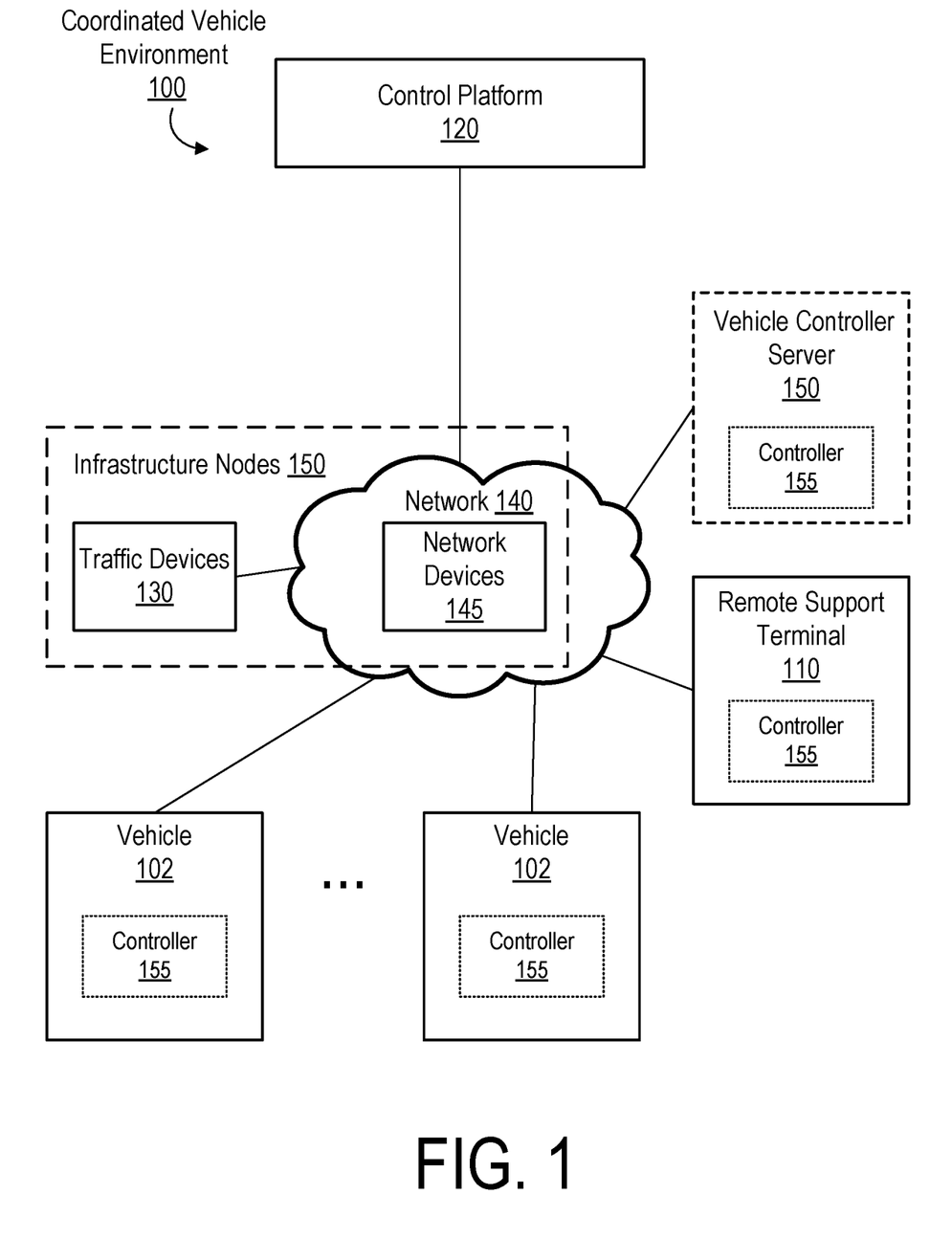
FIG. 1 is a block diagram illustrating an example of a coordinated vehicle environment in accordance with one embodiment.

FIG. 1 is a block diagram of a coordinated vehicle environment 100 including a plurality of vehicles 102, one or more remote support terminals 110, a control platform 120, and infrastructure nodes 150 including traffic devices 130 and network devices 145. The network devices 145 collectively form one or more networks 140. The coordinated vehicle environment 100 may furthermore include one or more vehicle controllers 155, which may be integrated into the vehicles 102, integrated with a remote support terminal 110, or may be implemented on a dedicated vehicle controller server 150. In alternative embodiments, the coordinated vehicle environment 100 may include different or additional components. Components of the coordinated vehicle environment 100 may be implemented as a processor and a non-transitory computer-readable storage medium that stores instructions that when executed causes the processor to perform the functions attributed to the respective components described herein.

The vehicle 102 comprises a land vehicle (e.g., a car or truck), a seaborne vehicle, a subterranean vehicle, an airborne vehicle, or other vehicle. The vehicle 102 may comprise an intelligent transport system (ITS) that connects to the network 140 and communicates with one or more other entities via the network 140 (e.g., the remote support terminal 110, the control platform 120, the traffic devices 130, the vehicle controller server 150, and/or other vehicles 102) to enable the vehicle 102 to obtain information useful for safe navigation of an environment. In an embodiment, the vehicle 102 may comprise an autonomous or semi-autonomous vehicle that includes an autonomous drive system that automatically controls navigation based on sensed environment conditions. Alternatively, the vehicle 102 may include a non-autonomous vehicle that relies on control inputs from a driver in the vehicle 102 or from a remote teleoperator at a remote support terminal 110. In the case of teleoperation, the vehicle 102 wirelessly receives control inputs via the network 140 that control various components of the drive system such as the steering system, acceleration, braking, etc. The vehicle 102 may comprise various sensors that capture image data and other environmental data to enable an autonomous drive system or remote teleoperator to navigate the vehicle 102.

The remote support terminal 110 communicates with a vehicle 102 to provide remote teleoperation or other support services. In an embodiment, the remote support terminal 110 may provide teleoperation support on demand in instances when extra assistance is desired. For example, the vehicle 102 may request teleoperation assistance from the remote support terminal 110 when one or more vehicle sensors fails, when an unknown problem occurs with the vehicle's autonomous drive software, when the vehicle 102 encounters a barrier or other hazardous road conditions, or when a passenger manually requests remote assistance. Upon requesting remote support, a video stream capturing the vehicle environment may be provided by the vehicle 102 to the remote support terminal 110 to enable the remote support terminal 110 to assess the situation and take appropriate action. For example, the remote support terminal 110 may provide controls to remotely drive the vehicle 102. The controls may be provided by a human agent that is viewing real-time video captured by the vehicle 102 in a manner that simulates driving of the vehicle 102 from the perspective of the human agent. Alternatively, the controls may be provided by an artificial intelligence agent that executes on the remote support terminal 110 in response to a real-time video feed and other sensor data streamed to the remote support terminal 110 from the vehicle 102.

In other embodiments, the remote support terminal 110 may provide different support to the vehicle 102 that does not necessarily involve teleoperation. For example, the remote support terminal 110 may provide voice support to a driver or passenger of the vehicle 102. In other cases, the remote support terminal 110 may provide navigation services to re-route a vehicle 102 or otherwise assist a vehicle 102 in navigating to a destination. In other examples, the remote support terminal 110 may provide software or firmware updates to a vehicle 102.

The traffic devices 130 include signal lights or other traffic control systems that aid in controlling traffic of vehicles 102. For example, the traffic devices 130 may provide signals indicating which vehicle 102 has a right of way at intersections, one-way bridges, or other congested areas. The traffic devices 130 may also obtain information about the locations of the vehicles 102 and may intelligently adapt traffic control signals according to a traffic control policy to reduce overall congestion.

The network 140 represents the communication pathways between the vehicles 102, the remote support terminals 110, the traffic devices 130, and the control platform 120. In one embodiment, the network 140 uses standard communications technologies and/or protocols and can include the Internet. In another embodiment, the entities on the network 140 can use custom and/or dedicated data communications technologies. The network 140 may comprise, for example, a public cellular connection, a dedicated or private wireless network, a low-latency satellite uplink, VANET wireless channels (including vehicle-to-vehicle or vehicle-to-infrastructure links), or any combination thereof. The network 140 includes a plurality of network devices 145 such as cell towers, routers, switches, or other components that provide network services to the entities connected to the network 140. The network devices 145 may have varying capabilities and may be spread over a wide geographic area. Thus, different allocations of network resources may be available to vehicles 102 in different locations at different times.

The control platform 120 obtains information about the vehicles 102 and infrastructure nodes 150 and generates control commands to coordinate the sharing of data and use of a limited number of service resources available to the vehicles 102. For example, relatively high network bandwidth may be utilized by vehicles 102 when streaming video and other sensor data to a remote support system 110, and this bandwidth may be limited when a significant number of vehicles are competing for network resources made available by the network devices 145 in the vicinity. Here, the control platform 120 may coordinate allocation of network resources between different vehicles 102 to optimize an overall coordination policy. Furthermore, the control platform 120 may coordinate the sharing of data between vehicles 102, traffic devices 130, and remote support terminals 110 to enable the population of vehicles 102 to make better decisions and operate more safely and efficiently. Further still, the control platform 120 may generate commands to the vehicles 102, traffic devices 130, or remote support terminals 110 to cause vehicles 102 to alter their navigation routes to better enable use of available network resources.

In an embodiment, the control platform 120 operates in a manner that is agnostic to the vehicle platform. Here, the control platform 120 does not directly control operation of the vehicles 102, but instead provides a coordination policy that if adhered to by a population of vehicles 102, will optimize an overall optimization criterion thereby generally benefiting the population.

The vehicle controller 155 controls communication operations of one or more vehicles 102 under its control. For example, a controller 155 may control a level of network resources utilized by a particular vehicle and may control the sharing of network resources by the vehicle 102 with other vehicles 102 on the network 145. The vehicle controller 155 may obtain commands or coordination policies from the control platform 120 and make decisions about whether or not a given vehicle 102 complies with or ignores the coordination policy issued by the control platform 120.

In an embodiment, a controller 155 may be integrated into a vehicle 102. Alternatively, a controller 155 may be integrated into a remote support terminal 110 that makes decisions about resource allocation of a supported vehicle 102. In another embodiment, a controller 155 may be integrated into a dedicated vehicle controller server 150 that makes communication control decisions for one or more vehicles 102 and provides control parameters to the one or more vehicles 102 to carry out the decisions. A given vehicle controller 155 may control a single vehicle 102 or may make collective decisions to control a fleet of vehicles 102. For example, a controller 155 may be operated by a fleet operators, owner, or manager of a fleet of vehicles that makes decisions on policy compliance for vehicles 102 under its control. Additionally, in some embodiments, a high-level fleet controller 155 may make decisions at a fleet level, while individual vehicle controllers 155 may make vehicle-specific decisions at a vehicle level. As discussed in further detail below, the control platform 120 generally sets for coordination policies that encourages compliance by rewarding controllers 155 of vehicles 102 that adhere to the policies and penalize those who defect from it.

Figure 2:
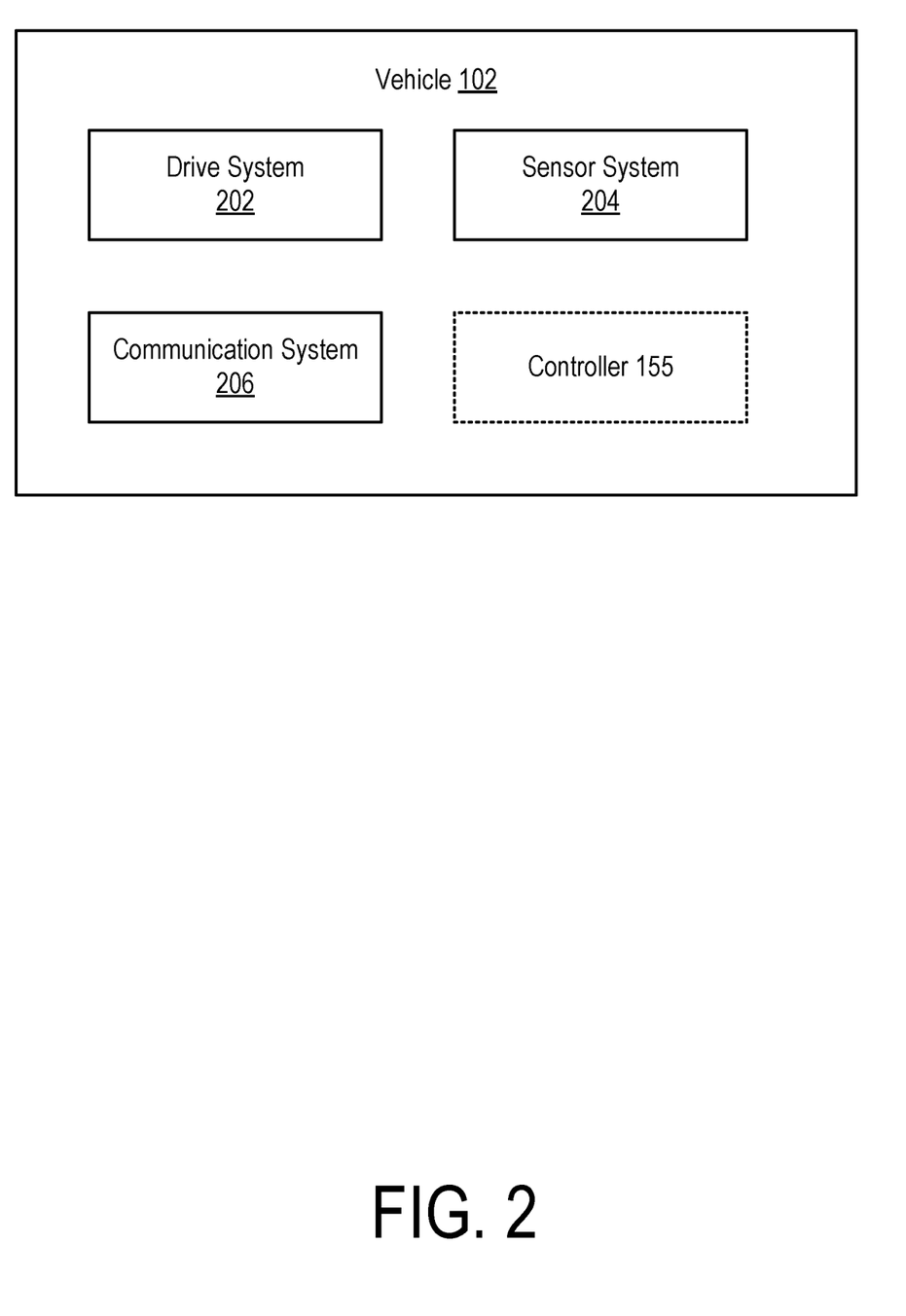
FIG. 2 is a block diagram illustrating an example of a connected vehicle in accordance with one embodiment.

FIG. 2 illustrates an example embodiment of a vehicle 102. The vehicle 102 comprises a drive system 202, a sensor system 204, a communication system 206, and a coordination system 208. Alternative embodiments may include additional or different components.

The drive system 202 includes standard components for a vehicle drive system include, for example, wheels, axes, transmission, engine, brakes, etc. In an autonomous vehicle, the drive system 118 may furthermore include an autonomous drive system that enables the vehicle 102 to drive autonomously. For example, the autonomous drive system may include hardware and software for enabling the vehicle to automatically navigate a desired route.

The sensor system 204 includes various sensors for capturing environmental data useful for enabling the autonomous drive system or a remote teleoperator to control navigation of the vehicle 102. For example, the sensor system 204 may include one or more cameras for capturing video depicting the environment of the vehicle 102. The sensor system 204 may furthermore include proximity sensors, motion sensors, position sensors, temperature sensors, or other sensors for sensing various aspects of the vehicle environment.

The communication system 206 communicates video, sensor data, or other control signals to the remote support terminal 110 and to the control platform 120. The communication system 206 may furthermore receive teleoperation or other support signals from the remote support terminal 110 and may receive commands from the control platform 120 or an external controller 155 to enable the vehicle 102 to carry out a coordination policy. In an embodiment, the communication system 206 comprises one or more modems for communicating over a cellular network, a WiFi network, a Bluetooth network, or other wireless network. The communication system 116 may furthermore include a low-Earth orbit satellite communication subsystem, or a vehicle-to-vehicle or vehicle-to-infrastructure (V2V and V2I, correspondingly) 802.11p VANET communications system. The communication system 116 may furthermore include storage (e.g., a solid state drive) to store data streams locally for later transmission.

If the vehicle 102 includes an integrated controller 155 for implementing a communication policy from the control platform 120, the controller 155 obtains the commands from the control platform 120 and implements the commands to carry out a coordination policy dictated by the control platform 120. The coordination policy may cause the vehicle 102 to limit network resources it utilizes for communications with the remote support terminal 110 or other entities on the network 140 or may cause the vehicle 102 to share a connection with another connected vehicle 102 by relaying data to and from the connected vehicle 102. Additionally, the coordination policy may cause the vehicle 102 to update its navigation route (e.g., to avoid a congested area in which network resources may be limited). In an embodiment, the coordination policy may comprise a cooperative policy in which the vehicles 102 cooperate in a manner that maximizes some optimization criterion for the population of vehicles 102. Alternatively, the coordination policy may comprise a competitive policy in which the vehicles 102 operate to compete for resources within a structured marketplace framework that enables optimization based on competitive principles.

In the absence of an integrated controller 155, the communication system 206 may instead operate in response to commands received from an external controller 155 that is integrated in another vehicle 102, a remote support terminal 120, or a controller server 150.

Figure 3:
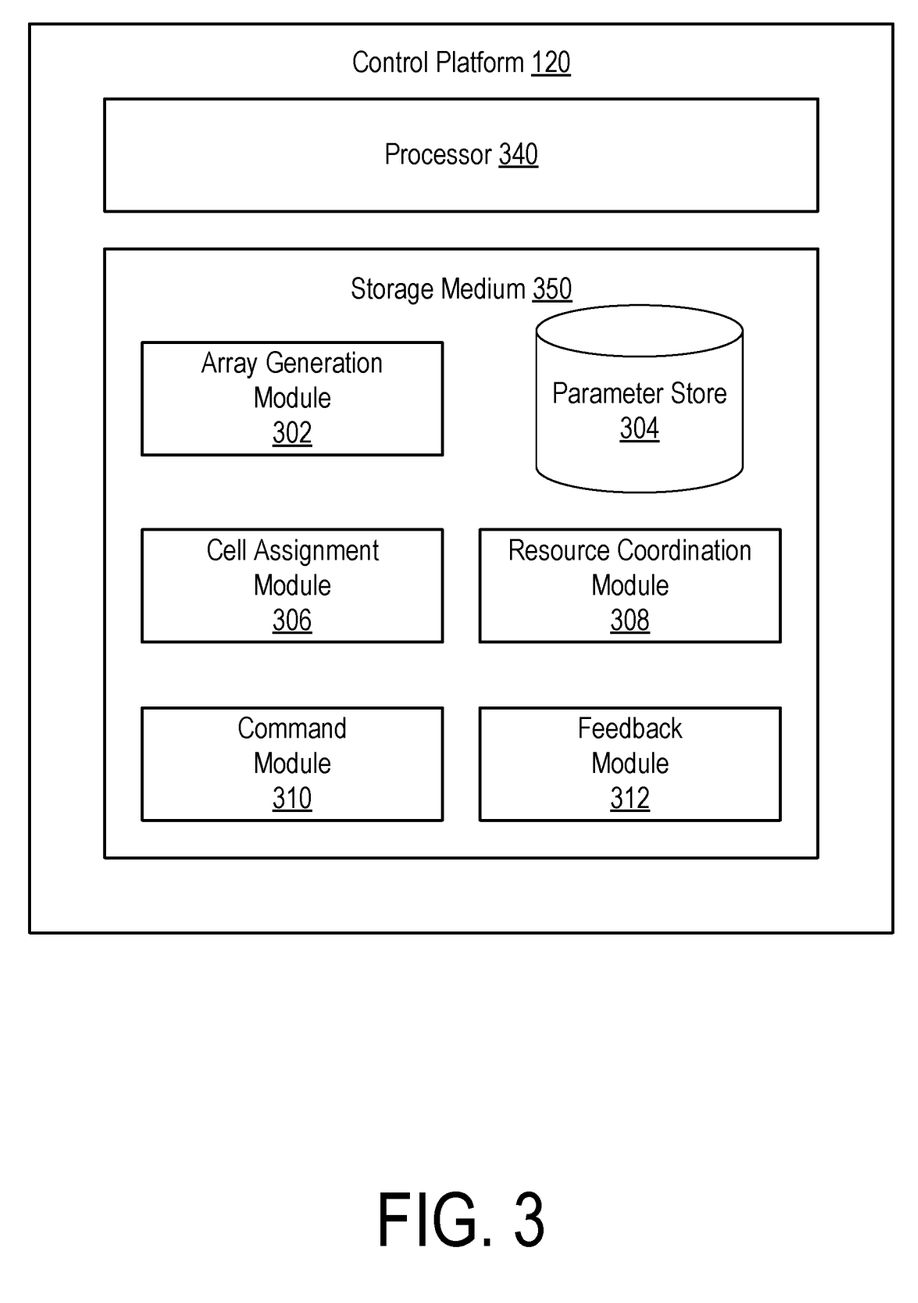
FIG. 3 is a block diagram illustrating an example of a control platform in accordance with one embodiment.

FIG. 3 illustrates an example embodiment of a control platform 120. The control platform 120 comprises a processor 340 and non-transitory computer readable storage medium 350 that stores instructions for carrying out the functions of various modules when executed by the processor 340. In an embodiment, the storage medium 350 stores an array generation module 302, a parameter store 304, a cell assignment module 306, a resource allocation module 308, a central command module 310, and a feedback module 312. The control platform 120 may comprise a central server or one or more distributed servers. For example, various modules of the control platform 120 may execute on different physical servers that may be at remote physical locations from each other. In various embodiments, one or more components of the control platform 120 may execute on a dedicated server, on one or more remote support terminals 110, on one or more vehicles 102, on one or more infrastructure nodes 150, or may be distributed across a combination thereof.

For example, in one embodiment, local instances of the control platform 120 are instantiated on roadside infrastructure nodes 150 (e.g., network devices 145 or traffic devices 130) with each infrastructure node 150 managing a cell or set of cells. The local infrastructure nodes 150 may transmit obtained parameters to a central server where they may be aggregated and the central server may then redistribute aggregated data to the local infrastructure nodes 150 in a feedback loop.

In another embodiment, local instances of the control platform 120 may be installed directly on vehicles 102. Here, each instance may process an individual vehicle's interactions with other parties. To prevent a vehicle from tampering with the control platform 120 or the data it collects, various security functions may be employed, including, for example, checksum integrity checks, code obfuscation, or white-box cryptographic measures.

The array generation module 302 obtains from the vehicles 102 (e.g., directly or indirectly via a remote support terminal 110) a set of parameters describing the state of each vehicle 102 and generates a multi-dimensional array representing the acquired states that is stored to the parameter store 304. Parameter fields may include information such as the location of the vehicle 102, functions being performed by the vehicle 102, connections between the vehicle 102 and other entities (e.g., remote support terminals 110, infrastructure nodes 150, or other vehicles 102), requests by the vehicle 102 for network resources, usage of network resources, or other information relevant to coordinating between vehicles 102. Parameter values may be either policy-defined or empirically established. The multi-dimensional array may describe interrelationships between vehicles in adjacent locations. For example, a geographic area may be divided into cells, and the array may track which vehicles 102 are associated with different cells at a given time.

The cell assignment module 306 tracks motion of vehicles and generates a three-dimensional representation of the locations of vehicles 102 at different times (e.g., a timestamp and a pair of surface coordinates, such as latitude and longitude). The cell assignment module 306 then assigns each vehicle 102 to a cell representing a geographical region based on the tracked locations. The cells may be fixed or may be updated dynamically based on different conditions.

In an embodiment, cell sizes are chosen according to some criteria (such as the historical activity level of vehicles 102 in a geographic region). This technique may reduce the number of tracked cells by describing a low-activity region such as a rural area with a single larger cell, and describing downtown areas with higher granularity using a larger number of smaller cells. The density of the cells may also contribute to the choice of cell size.

In another embodiment, the cell assignment module 306 automatically manages a graph representation of the cells by merging and splitting cells according to some criteria while maintaining information for updating edges appropriately. For instance, the cell assignment module 306 may initially represent a region with micro-sized cells, track the usual level of activity in these microcells for a reasonable length of time, and then merge cells representing a stretch of a rural road into a single cell. The rules governing the graph manipulation process may be chosen in multiple various ways depending on circumstances; for instance, the cell assignment module 306 may probabilistically optimize for the maximum number of vehicles 102 simultaneously occupying each cell to be equal, or may probabilistically optimize for the computation difficulty of planning each node's network resources to be equal.

In another embodiment, the cell assignment module 306 represents the managed area with a continuous configuration space, and describes estimated vehicle events (i.e. specific positions at specific times) with probabilistic wave functions. Specific choice of wave function and the set of arguments are to be made depending on the specific circumstances such as the expected road network topology and available computational power.

In another embodiment, asymmetrical wave functions describing estimated vehicle events are chosen to reflect the inherently directional nature of a vehicle position probability distribution change. The specific function expression may depend on vehicle maneuverability and other technical parameters.

In another embodiment, the cell assignment module 306 represents the managed area with a discrete graph as described above, but assigns probabilistic distributions discretely split between cells to estimated vehicle events instead of assigning each vehicle 102 to a single cell at any time.

In another embodiment, the cell assignment module 306 represents the managed area with a discrete graph as described above, but replaces individual vehicles 102 with "macroparticles" that each represent a plurality of vehicles 102. This embodiment may optimize the computation time at the cost of reduced prediction accuracy. Macroparticles are configured to represent the most probable vehicle routes, and can be split and merged depending on the local traffic patterns.

In another embodiment, the cell assignment module 306 represents the managed area with a geospatial index operating on a planar or spherical surface. Such an index may support multiple levels of resolution, and allow to dynamically select the resolution required for processing the configuration space representing a given geographic area.

The resource coordination module 308 obtains the cell information and assignments of vehicles 102 to different cells and then models the current state of network resources available to vehicles 102 within each cell to coordinate allocation of resources. The resource coordination module 308 generates commands to the controllers 155 of the vehicles 102 (directly or via authorized gateways provided by the appropriate third parties) to control allocation of available resources in a coordinated manner. For example, the resource coordination module 308 may determine how much bandwidth of a network device 145 may be allocated for use by each connected vehicle 102. The commands may inform the controller 155 of the vehicles 102 of bandwidth allocated to them conditionally or unconditionally, recommend radio bands to use and avoid, manage data shared between vehicles, and inform the controllers 155 of the vehicles 102 of predicted road and network situation along their respective routes so that vehicles 102 and any connected remote support terminals 120 can effectively plan and optimize their future actions. The resource coordination module 308 may also coordinate vehicle-to-vehicle connections to enable a vehicle 102 to share a vehicle-to-network connection of another vehicle 102. For example, a vehicle with a poor vehicle-to-network connection may make a vehicle-to-vehicle connection to a vehicle 102 having a strong vehicle-to-network connection and that vehicle 102 may operate to relay data to and from the poorly connected vehicle 102 in a cooperative manner.

To ensure a level of coordination that benefits a community of vehicles 102 as a whole, the resource coordination module 308 may employ various optimization policies, examples of which are described in further detail below. These optimization policies may employ game-theoretical techniques to encourage individual vehicles 102 to comply with the policies (i.e., share resources as dictated by the policy) and discourage defection (i.e., ignoring the policy for individual gain). For example, in an embodiment, the resource coordination module 308 computes a karma score for each controller 155 derived from the parameters in the data store 304 that represents a historical level of compliance of one or more vehicles 102 under its control with a coordination policy dictated by the resource coordination module 308. The resource coordination module 308 may update the coordination policy based on the karma scores to reward controllers 155 of vehicles 102 with high levels of compliance and/or penalize controllers of vehicles 102 that have poor compliance with the coordination policies. In the case of a controller 155 that controls a fleet of vehicles 102, karma scores may be computed so that defection by one vehicle 102 operated by a such a controller 155 for the vehicle fleet may generate consequences for other vehicles 102 in the fleet operated by the same controller 155. In other embodiments, karma scores may be computed independently for individual vehicles 102 within a vehicle fleet. In this case, the controller 155 for the fleet may be treated as a set of individual controllers 155 each associated with a different vehicle 102 in the resource allocation algorithms described herein.

In one embodiment, the resource coordination module 308 models the dynamics of the vehicles 102 in the managed area as an infinitely repeated multi-agent game, also known as a supergame, with a discounted payoff. Here, the resource coordination module 308 maintains a non-cooperative game while adjusting associated payoffs in a way that would enable sufficient conditions for Pareto or Bayesian efficiency (depending on the implementation) and the desired degree of fairness, or enable Nash equilibria states (with respect to network resource allocation) with properties resembling those of cooperative solutions. For example, the resource coordination module 308 may account for the fact that the marginal utility of allocation of a physical resource block (PRB) to a poorly connected vehicle 102 is greater than the allocation of the same PRB to a vehicle 102 having stronger connectivity. The game may be infinitely repeated, which according to the Folk theorem, there are Pareto-optimal subgame perfect Nash equilibria (SPE) in a repeated game formulation even if the single shot game formulation Nash equilibria are not Pareto-optimal. These equilibria depend on the capability of controllers 155 to perform retribution in further games against a defecting controller 155. For instance, in case of a discounted payoff a grim trigger punishment strategy or a punisher-rewarding strategy may be applied to achieve an SPE.

In an embodiment, the resource coordination module 308 determines cooperation and defection outcomes based on empirical evidence on how much the behavior of a controller 155 of a vehicle 102 deviates from agreed upon rules, computing a karma score (e.g. a scalar or a vector describing the controller's history of cooperation and defection), and propagating information on this score of all participating controllers 155 among their peers. This information may further be used by controllers 155 of other vehicles 102 to determine their own preferences for cooperation. For instance, if a vehicle 102 communications use vehicle-to-vehicle (V2V) channels, and the controller 155 of that vehicle 102 regularly defects and violates the rules determined by the resource coordination module 308, that controller 155 may see communication volume of the vehicle 102 it operates forwarded to infrastructure destinations such as smart traffic lights or cellular base stations by other vehicles 102 plummet to a mandated minimum. Based on information available from the control platform 120, other vehicles 102 may no longer share their extra spectral bands, available bandwidth or auxiliary information with the defecting vehicle 102, but would continue assisting other cooperating controllers 155 of vehicles 102.

In another embodiment, the resource coordination module 308 uses a variation of the above approach where the formulation of the original N-player game utilities is decomposed into the sums of utilities of a plurality of 2-player games. In other words, an infinitely repeated supergame is created for each controller 155, in which the resource coordination module 308 assumes the role of the second player. Such a succinct polymatrix representation allows to reduce the size of the payoff matrix and, therefore, the computational complexity of the game, which has the form of $O(N\ a^N)$, where N is the number of controllers 155 of vehicles 102, and a is the number of strategies available to each controller 155. In this embodiment, finding a correlated equilibrium in a succinctly representable game requires polynomial time. The game choices available to the platform-as-player are also naturally different from those made by third-party controllers 155, and the payoff structure is strongly asymmetrical as well. Some of the choices available to the control platform 120 may be treated as defections by controllers of vehicles 102, but for the purposes of solution stability the payoff of the control platform 120 may be low, zero, or even negative (i.e. the control platform 120 has no incentive to defect in any particular game without what would be identified as a good reason, business-wise). For instance, the control platform 120 may decide to allocate a smaller share of network resources to a particular vehicle 102 than theoretically possible if the total payoff in one or more other concurrently running games would substantially improve (i.e. the temporary benefits provided to another vehicle 102 are considered more important), or re-route a vehicle 102 through a longer path in order to reduce congestion on the shorter one. The payoff structure for future games may be adjusted to disincentivize repeatedly defecting in the same game, thus reducing the chance of an unfair treatment of a specific controller 155. This approach can be particularly useful in a V2I system if the parties controlling the infrastructure nodes 150 observe signals and recommendations issued by the control platform 120, thus enabling it to manipulate payoffs and penalties to compliant and non-compliant vehicles 102 with a lesser degree of indirection.

In another embodiment, the asymmetric two-population game involving the control platform 120 as a one player and a controller 155 as another is decomposed into a plurality of symmetric, single-population, independent games.

In another embodiment, the complexity of the original game formulation is reduced by its decomposition into partial games based on empirical evidence on the interaction graph between the vehicles 102 involved.

In another embodiment, controllers 155 of vehicles 102 have the possibility to explicitly inform the control platform 120 of their intentions to defect conditionally or unconditionally (e.g., when the controller 155 has special requirements for traversing a road segment that cannot be communicated to the control platform 120 in more detail). This may be used to give the control platform 120 a head-start in assessing the situation and preparing other vehicles 102 to avoid congestion, but such a defection will still incur a karma score penalty against the controller 155.

The control platform 120 may use a variety of strategies to reward and penalize agents in either symmetrical or asymmetrical game formulations, such as stochastically forgiving generous tit-for-tat or grim trigger.

In one embodiment, specific strategies to use are developed, tested and deployed manually. In another embodiment, specific strategies are automatically created and validated by the platform using genetic algorithms. Here, validation is executed against a predetermined utility function. In another embodiment, specific strategies are chosen using reinforcement learning. Using the multi-armed bandit exploration and exploitation technique, the platform tests all available strategies with substantially equal frequency. Strategies that lead to better total payoffs (which include but are not limited to signals of less frequent controller defections) are then allocated a higher frequency at the expense of the other strategies. This will lead to a gradual decrease of the share of less performant strategies and their replacement by more advanced ones. This approach precludes disclosing the strategies used to controllers of vehicles 102, as the controllers 155 cannot be timely informed of the exact strategy that will be used in a specific repetition of the game.

In another embodiment, the multi-armed bandit learning problem is augmented to describe the optimization problem in adversarial terms rather than in stochastic ones. This approach guarantees a quasi-optimal payoff even if the payoff for each action is completely controlled by the adversary. Such an improvement is required to prevent a malicious agent from first gaming the platform's strategy selection algorithm and then exploiting the generated weaknesses.

In a further embodiment, the control platform 120 also computes predicted effects of co-channel interference and issues recommendations on cellular base node selection to vehicles that advertise support of such functionality via a specially designed program interface. In a further embodiment, the same method may be used to issue physical resource block sharing recommendations along the guidelines of the accepted technical solution for the used cellular technology, such as Orthogonal Frequency Division Multiple Access (OFDMA) for an LTE-Advanced network.

In a further embodiment, the same method may be used to issue low-Earth orbit communication satellite (LEOCS) access recommendations. The additional challenge in this scenario is the fact that communication satellites are fast-moving targets, and game matrices therefore evolve much more dynamically. Besides, while cellular nodes have narrow communication fields, are relatively short-range and numerous, LEOCS footprints may cover a much larger area and thus a significant number of vehicles simultaneously. To prevent the control platform's performance degradation, this embodiment may process satellite communications separately, with each operational LEOCS footprint being treated as a separate graph node, or a separate cell in any of the aforementioned discrete or probabilistic representations. This separate embodiment should take into account the following special conditions: a) the number of nodes corresponding to LEOCS is low; b) due to relatively stable orbits their positions and footprints can be accurately predicted for a considerable length of time; and c) the degree of association of individual vehicle with each LEOCS is time-dependent due to changes in relative positions and attitudes of vehicles and satellites.

In a further embodiment, the same method may be used to issue recommendations on modulation scheme selection (such as switching between QPSK, 16QAM or 64QAM).

In another embodiment, the resource coordination module 308 acts as a commodity exchange, and resource allocation and prioritization is represented as execution spot, futures or forward contracts. Here, controllers 155 of vehicles 102 may sell or buy resources such as network service priority and bandwidth from other agents sharing the same network resources, and the resource coordination module 308 uses performance analysis to determine if contracts are actually being honored (e.g. to test if a vehicle 102 sells a portion of bandwidth allocated to it by default and continues competing for it regardless). Such a representation corresponds to a non-cooperative game with incomplete information, and the specific rules may be gradually updated to reflect the state of the art, and to promote or inhibit formation of vehicle coalitions depending on the current requirements.

In another embodiment, the resource coordination module 308 acts as a commodity exchange where access to network resources with the desired degree of logical granularity is being traded, such as physical resource blocks, or access to specific spectral radio bands for specific durations. A purchased PRB is considered reserved to the buyer, and the resource coordination module 308 penalizes either the seller or third-party vehicles for attempts to compete for it. The degree of granularity supported should be chosen depending on local circumstances. For instance, trading longer access intervals may reduce the total computing load but may create situations where a cellular node is underutilized when a purchased interval has not yet expired, but the vehicle 102 that has purchased it has already relocated to a different node. Inversely, a high degree of granularity may create an extremely high load on the wireless network and the servers.

In a further embodiment, the resource coordination module 308 also covers trading of network resources such as access to VANET transmissions routed via the vehicles 102. As some approved VANET technologies are based on 802.11p specifications, and future designs may be based on substantially different principles, in this embodiment the specific commodities and terms denoting them may differ, but the concepts remain similar.

In a further embodiment, the resource coordination module 308 also covers trading of network resources such as access to low-Earth orbit (LEO) communication satellites. The additional challenge in this scenario is the fact that communication satellites are fast-moving targets, and network resource availability intervals should be processed with higher granularity in order to avoid excessive underutilization as well as correctly identify satellite availability footprints, time ranges, and quality of service.

In another embodiment, the resource coordination module 308 acts as a commodity exchange where access to application-level resources used by vehicle technologies is being traded, such as LIDAR, sonar or radar scans, optical and infrared video feeds. Each resource packet is identified by metadata such as the geographical coordinates, a pluscode, or a road section identifier to determine the relevant area, the timestamp of its formation, payload type, and data provider (merchant) identifier. Controllers 155 of vehicles 102 may also trade derivative data, such as a depth map extracted from a stereo image, or a time-dependent obstacle probability distribution function for a road section.

Locating an optimal planning solution in the configuration space representing the managed area may be treated as a search problem. In this scenario, the resource coordination module 308 may use the current state (e.g. a data set attributing vehicle identifiers to the respective cells they are located in) as the initial node in the search space, and the desired state (e.g. a data set attributing vehicle identifiers to the cells they have declared to be travelling to) as the solution. Afterwards, the platform may use any state of the art search algorithm such as A* and an admissible heuristic to construct an optimal routing solution for the vehicles 102.

In one embodiment, the resource coordination module 308 constructs a search space by creating all possible configuration space versions reflecting the available road network graph and vehicles 102 currently engaged in the system. Each dimension in such a configuration space reflects a single vehicle's degree of freedom, for instance along a chosen branch of the road network graph, or (in a simplified version) along enumerated discrete points, each corresponding to a node in the road network graph.

In another embodiment, the resource coordination module 308 constructs a search space by first solving a relaxed problem of vehicle coordination in the managed area, i.e. modelling possible states of each vehicle independently for all cases that do not incur penalties for individual vehicle and their controllers higher than a predetermined threshold. Such a threshold may either be chosen globally for all participating controllers, or negotiated with each controller individually. This relaxed problem is then used as a heuristic for the search procedure.

In another embodiment, the resource coordination module 308 first performs a clustering procedure using state of the art methods to group managed vehicles into subsets with non-intersecting routes and resource requirements in order to simplify the solution search. Each subset is then processed separately.

In another embodiment, the resource coordination module 308 reduces the problem complexity by splitting the managed area into multiple non-intersecting geographic regions, and solves the optimization problem for each region separately. Vehicles leaving or entering a region are created or removed from the appropriate model, accordingly.

In another embodiment, the resource coordination module 308 tracks historical data on characteristics of specific cells and cell collections, and uses other dynamically changing data to improve payoff prediction accuracy.

The command module 310 dispatches appropriate subsets of the multi-dimensional array to the controllers of vehicles 102 and the infrastructure nodes 150 to share data collected from the community of vehicles 102. For example, the controller 155 of each vehicle 102 may receive information pertaining to other vehicles 102 within the same cell. These updates can be sent either regularly, or at time points determined in a suitable fashion.

The feedback module 312 obtains feedback from the vehicles 102 and the infrastructure nodes 150 to determine the level of cooperation of each vehicle 102. The feedback module 312 then updates the parameter store 302 based on the compliance level. For example, the feedback module 312 may obtain data indicative of compliance of the vehicles 102 with the coordination policy to enable the resource coordination module 308 to update the respective karma scores accordingly.

Figure 4:
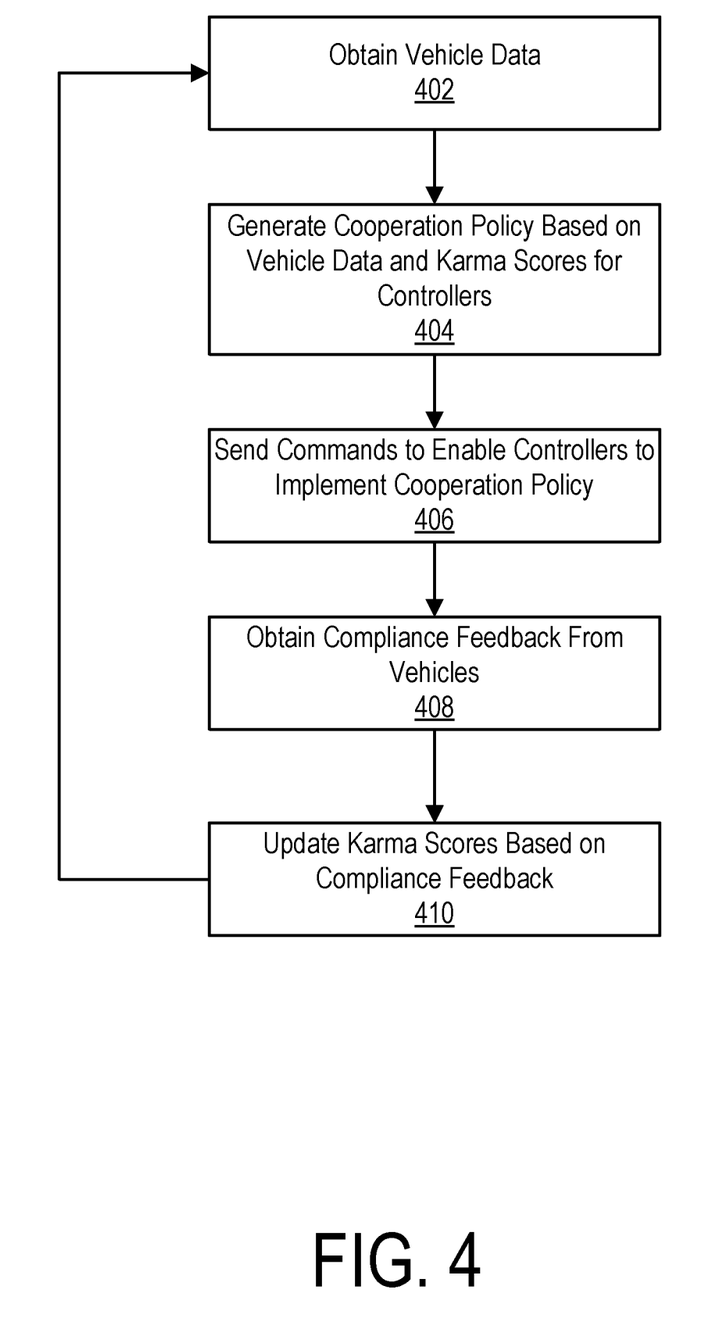
FIG. 4 is a flowchart illustrating an embodiment of a process for coordinating allocation of network resources between a plurality of vehicle in accordance with one embodiment.

FIG. 4 illustrates an embodiment of a process for coordinating between a plurality of vehicles 102. The control platform 120 obtains 402 vehicle parameters describing a current state of vehicles 102 within a particular cell. The control platform 120 generates a coordination policy based on the vehicle parameters and karma scores associated with each of the vehicles 102 within the cell. Here, the coordination policy dictates how available network resources are allocated between vehicles 102, how vehicles 102 in vehicle-to-vehicle connections may share resources by relaying information to other vehicles 102 or infrastructure nodes 150, and/or how vehicles 102 should adjust navigation routes to optimize availability of resources. The coordination policy may be generated using any of the techniques described above. For example, in one embodiment, the coordination policy may be generated according to a game theoretical optimization problem. In another embodiment, the control platform 120 may generate the coordination policy by broadcasting resource availability of each respective vehicle 102, obtaining bids from the controllers of the vehicles 102 for available resources, and determining the allocation of the resources based at least in part on the bids. The control platform 120 sends 406 commands to the controllers 155 of the vehicles 102 based on the coordination policy to enable the controllers 155 of the vehicles 102 to implement the coordination policy. The control platform 120 obtains 408 feedback from the vehicles 102 indicative of their respective compliances with the coordination policy. The control platform 120 then updates 410 the karma scores based on the compliance feedback. For example, the control platform 120 may adjust the karma scores in a manner that rewards controllers 155 of vehicles 102 that comply with the coordination policy while penalizing controllers 155 of vehicles 102 that defect from compliance with the coordination policy. The process of FIG. 4 may be repeated at periodic intervals.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

The invention claimed is:

1. A method for coordinating between a plurality of vehicles connected to one or more networks, the method comprising:
    obtaining, for each of the plurality of vehicles over the one or more networks, respective sets of state parameters describing respective states of the plurality of vehicles;
    maintaining, for controllers of each of the plurality of vehicles, respective karma scores indicating measures of historical compliance with respective coordination policies for controlling sharing of network resources of the one or more networks between the plurality of vehicles, wherein the respective coordination policies include a policy for planning a route of a vehicle based on availabilities of the network resources in different geographic areas;
    identifying a plurality of cells associated with the different geographic areas;
    updating, based on the respective sets of state parameters and the respective karma scores for controllers of the plurality of vehicles that are within a same cell of the plurality of cells, the respective coordination policies for the plurality of vehicles;
    dispatching the respective coordination policies to the controllers of the plurality of vehicles;
    obtaining feedback from the plurality of vehicles indicating respective current compliances with their respective coordination policies; and
    updating the respective karma scores based on the feedback.

2. The method of claim 1, wherein updating the respective coordination policies comprises solving a game-theoretical problem to allocate the network resources in a manner that maximizes an optimization criterion.

3. The method of claim 1, wherein the respective coordination policies include a policy for a first vehicle to forward communications between a second vehicle and a network device.

4. A method for coordinating between a plurality of vehicles connected to one or more networks, the method comprising:
    obtaining, for each of the plurality of vehicles over the one or more networks, respective sets of state parameters describing respective states of the plurality of vehicles;
    maintaining, for controllers of each of the plurality of vehicles, respective karma scores indicating measures of historical compliance with respective coordination policies for controlling sharing of network resources of the one or more networks between the plurality of vehicles;
    updating, based on the respective sets of state parameters and the respective karma scores, the respective coordination policies for the plurality of vehicles, wherein updating the respective coordination policies comprises:
        determining, based on the state parameters, respective availabilities of the network resources by the plurality of vehicles;
        distributing resource availability messages to the controllers of the plurality of vehicles indicating the respective availabilities of the network resources;
        obtaining in response to the resource availability messages, bids from the controllers of the plurality of vehicles for the network resources; and
        updating the coordination policies based on the bids;
    dispatching the respective coordination policies to the controllers of the plurality of vehicles;
    obtaining feedback from the plurality of vehicles indicating respective current compliances with their respective coordination policies; and
    updating the respective karma scores based on the feedback.

5. The method of claim 4, wherein the respective coordination policies include a policy for planning a route of a vehicle based on availabilities of the network resources in different geographic areas.

6. The method of claim 4, wherein the respective coordination policies include a policy for a first vehicle to forward communications between a second vehicle and a network device.

7. A method for coordinating between a plurality of vehicles connected to one or more networks, the method comprising:
    obtaining, for each of the plurality of vehicles over the one or more networks, respective sets of state parameters describing respective states of the plurality of vehicles;
    maintaining, for controllers of each of the plurality of vehicles, respective karma scores indicating measures of historical compliance with respective coordination policies for controlling sharing of network resources of the one or more networks between the plurality of vehicles;

dividing a geographic area into a plurality of cells;

updating the respective coordination policies based on the respective sets of state parameters and the karma scores for controllers of the plurality of vehicles that are within a same cell of the plurality of cells;

dispatching the respective coordination policies to the controllers of the plurality of vehicles;

obtaining feedback from the plurality of vehicles indicating respective current compliances with their respective coordination policies; and updating the respective karma scores based on the feedback.

8. The method of claim 7, wherein dividing the geographic area into the plurality of cells comprises:

dynamically updating sizes of the plurality of cells based on monitored activity of the plurality of vehicles within the geographic area.

9. The method of claim 7, wherein updating the respective coordination policies comprises solving a game-theoretical problem to allocate the network resources in a manner that maximizes an optimization criterion.

10. The method of claim 7, wherein the respective coordination policies include a policy for a first vehicle to forward communications between a second vehicle and a network device.

11. A non-transitory computer-readable storage medium storing instructions for coordinating between a plurality of vehicles connected to one or more networks, the instructions when executed by a processor causing the processor to perform steps including:

obtaining, for each of the plurality of vehicles over the one or more networks, respective sets of state parameters describing respective states of the plurality of vehicles;

maintaining, for controllers of each of the plurality of vehicles, respective karma scores indicating measures of historical compliance with respective coordination policies for controlling sharing of network resources of the one or more networks between the plurality of vehicles, wherein the respective coordination policies include a policy for planning a route of a vehicle based on availabilities of the network resources in different geographic areas;

identifying a plurality of cells associated with the different geographic areas;

updating, based on the respective sets of state parameters and the respective karma scores for controllers of the plurality of vehicles that are within a same cell of the plurality of cells, the respective coordination policies for the plurality of vehicles;

dispatching the respective coordination policies to the controllers of the plurality of vehicles;

obtaining feedback from the plurality of vehicles indicating respective current compliances with their respective coordination policies; and updating the respective karma scores based on the feedback.

12. The non-transitory computer-readable storage medium of claim 11, wherein updating the respective coordination policies comprises solving a game-theoretical problem to allocate the network resources in a manner that maximizes an optimization criterion.

13. The non-transitory computer-readable storage medium of claim 11, wherein the respective coordination policies include a policy for a first vehicle to forward communications between a second vehicle and a network device.

14. A non-transitory computer-readable storage medium storing instructions for coordinating between a plurality of vehicles connected to one or more networks, the instructions when executed by a processor causing the processor to perform steps including:

obtaining, for each of the plurality of vehicles over the one or more networks, respective sets of state parameters describing respective states of the plurality of vehicles;

maintaining, for controllers of each of the plurality of vehicles, respective karma scores indicating measures of historical compliance with respective coordination policies for controlling sharing of network resources of the one or more networks between the plurality of vehicles';

updating, based on the respective sets of state parameters and the respective karma scores, the respective coordination policies for the plurality of vehicles, wherein updating the respective coordination policies comprises:

determining, based on the state parameters, respective availabilities of the network resources by the plurality of vehicles;

distributing resource availability messages to the controllers of the plurality of vehicles indicating the respective availabilities of the network resources;

obtaining in response to the resource availability messages, bids from the controllers of the plurality of vehicles for the network resources; and updating the coordination policies based on the bids;

dispatching the respective coordination policies to the controllers of the plurality of vehicles;

obtaining feedback from the plurality of vehicles indicating respective current compliances with their respective coordination policies; and updating the respective karma scores based on the feedback.

15. The non-transitory computer-readable storage medium of claim 14, wherein the respective coordination policies include a policy for planning a route of a vehicle based on availabilities of the network resources in different geographic areas.

16. The non-transitory computer-readable storage medium of claim 14, wherein the respective coordination policies include a policy for a first vehicle to forward communications between a second vehicle and a network device.

17. A non-transitory computer-readable storage medium storing instructions for coordinating between a plurality of vehicles connected to one or more networks, the instructions when executed by a processor causing the processor to perform steps including:

obtaining, for each of the plurality of vehicles over the one or more networks, respective sets of state parameters describing respective states of the plurality of vehicles;

maintaining, for controllers of each of the plurality of vehicles, respective karma scores indicating measures of historical compliance with respective coordination policies for controlling sharing of network resources of the one or more networks between the plurality of vehicles;

dividing a geographic area into a plurality of cells;

updating the respective coordination policies based on the respective sets of state parameters and the karma scores for controllers of the plurality of vehicles that are within a same cell of the plurality of cells;
dispatching the respective coordination policies to the controllers of the plurality of vehicles;
obtaining feedback from the plurality of vehicles indicating respective current compliances with their respective coordination policies; and
updating the respective karma scores based on the feedback.

18. The non-transitory computer-readable storage medium of claim 17, wherein dividing the geographic area into the plurality of cells comprises:
dynamically updating sizes of the plurality of cells based on monitored activity of the plurality of vehicles within the geographic area.

19. The non-transitory computer-readable storage medium of claim 17, wherein updating the respective coordination policies comprises solving a game-theoretical problem to allocate the network resources in a manner that maximizes an optimization criterion.

20. The non-transitory computer-readable storage medium of claim 17, wherein the respective coordination policies include a policy for a first vehicle to forward communications between a second vehicle and a network device.

* * * * *